(12) United States Patent
Hermann et al.

(10) Patent No.: US 10,060,498 B2
(45) Date of Patent: Aug. 28, 2018

(54) THRUST BEARING FOR A PRESSURIZED SHOCK ABSORBER

(71) Applicant: Anvis Deutschland GmbH, Steinau an der Strasse (DE)

(72) Inventors: Waldemar Hermann, Jossgrund (DE); Volker Kalkhof, Gelnhausen (DE); Alexander Noll, Steinau an der Strasse (DE)

(73) Assignee: ANVIS DEUTSCHLAND GMBH, Steinau an der Strasse (DE)

( * ) Notice: Subject to any disclaimer, the term of this patent is extended or adjusted under 35 U.S.C. 154(b) by 57 days.

(21) Appl. No.: 14/918,832

(22) Filed: Oct. 21, 2015

(65) Prior Publication Data

US 2016/0116016 A1    Apr. 28, 2016

(30) Foreign Application Priority Data

Oct. 28, 2014  (DE) ................ 10 2014 016 004

(51) Int. Cl.
*F16F 7/00*    (2006.01)
*F16F 9/36*    (2006.01)
*F16F 1/38*    (2006.01)

(52) U.S. Cl.
CPC ............ *F16F 9/362* (2013.01); *F16F 1/3835* (2013.01); *F16F 2230/30* (2013.01)

(58) Field of Classification Search
CPC ...... F16F 9/362; F16F 9/06; F16F 9/36; F16F 1/3835; F16F 2230/30; F16C 17/04; F16C 2240/60; F16C 2361/53; B60G 15/12

USPC .... 267/141.2, 140.2, 141.3–141.7, 220, 293; 188/321.11; 280/124.155
See application file for complete search history.

(56) References Cited

U.S. PATENT DOCUMENTS

| | | | | |
|---|---|---|---|---|
| 4,248,454 A * | 2/1981 | Cotter | .................. | B60G 15/068 267/220 |
| 4,534,545 A * | 8/1985 | Fannin | ...................... | F16F 9/08 188/298 |
| 4,629,168 A * | 12/1986 | Buma | ...................... | F16F 9/084 267/219 |
| 4,810,003 A * | 3/1989 | Pinch | ................... | B60G 13/006 188/321.11 |
| 4,828,232 A * | 5/1989 | Harrod | ...................... | F16F 9/58 188/322.12 |
| 5,158,269 A * | 10/1992 | Hein | .................... | B60G 13/003 188/321.11 |
| 7,464,919 B2 * | 12/2008 | Hermann | .............. | B60G 15/068 267/141.7 |
| 8,025,274 B2 * | 9/2011 | Herman | ............... | B60G 13/003 267/141.4 |
| 2012/0161414 A1 * | 6/2012 | Scolaro | ................ | B60G 15/068 280/124.155 |
| 2016/0369839 A1 * | 12/2016 | Kondor | ................... | F16C 17/04 |

* cited by examiner

*Primary Examiner* — Pamela Rodriguez
(74) *Attorney, Agent, or Firm* — Gerald E. Hespos; Michael J. Porco; Matthew T. Hespos

(57) ABSTRACT

A thrust bearing for a pressurized shock absorber has an inner sleeve, an outer sleeve and an elastomer body. The elastomer body connects the inner sleeve and the outer sleeve and is configured to delimit a pressurizable space of the shock absorber. The elastomer body has at least one sealing geometry on the inner sleeve and/or on the outer sleeve.

20 Claims, 6 Drawing Sheets

THRUST BEARING FOR A PRESSURIZED SHOCK ABSORBER

BACKGROUND

1. Field of the Invention

The present invention relates to a thrust bearing for pressurized shock absorbers.

2. Related Art

Pressurized shock absorbers are used in vehicles to absorb the shock of ground unevennesses and to dampen the oscillations or respectively vibrations caused by the ground unevennesses. They are also designed as air spring struts, in which the damping rod extends through the air spring space of the air spring bellow, and the air spring space is delimited and sealed up on the vehicle side by means of a damper head mounting or respectively damper head seal. The connection of the air spring strut to the vehicle structure takes place via the damper head mounting.

The damper head mounting has in particular the function of sealing in an airtight manner the air spring space and also receiving axial and radial forces in a cushioning and dampening manner from the damping rod and transferring them to the vehicle structure via the bearing housing. For this, elastomer components are installed in the damper head mounting.

A single elastomer component can be provided to receive both axial as well as radial forces from the damping rod. However, it has proven advantageous to receive the axial forces by means of an axial bearing and to receive the radial forces by means of a separate thrust bearing. The thrust bearing can be designed annularly and arranged between the damping rod and the bearing housing so that radial forces from the damping rod via the thrust bearing can be transferred in a cushioned and dampened manner to the bearing housing.

To prevent compressed air from escaping out of the air spring space through the intermediate space between the thrust bearing and the damping rod and/or through the intermediate space between the thrust bearing and the bearing housing, sealing elements, usually O-rings, are provided at a suitable location.

Additional costs and additional installation effort for the damper head mounting occur due to the necessity of providing O-rings for sealing. Furthermore, there is a need to improve the sealing function as well as the service life of the damper head mounting.

The object of the invention is thus to provide an improved thrust bearing for pressurized shock absorbers, which reduces the costs and the installation effort for the damper head mounting and enables a better sealing function and lifespan of the damper head mounting.

SUMMARY

According to one aspect of the present invention, a thrust bearing for a pressurized shock absorber is provided, comprising: an inner sleeve; an outer sleeve; and an elastomer body. The elastomer body connects the inner sleeve and the outer sleeve and is configured to delimit a pressurized space of the shock absorber. The elastomer body has at least one sealing geometry that is designed on the inner sleeve and/or on the outer sleeve.

The thrust bearing concerns in particular a thrust bearing for a damper head mounting or respectively damper head seal of a pressurized shock absorber or respectively of an air spring strut. The thrust bearing can be designed annularly so that it can be arranged between a damping rod of the shock absorber and a bearing housing or respectively bearing cover of the damper head mounting (installed state) and radial forces from the damping rod can be transferred in a cushioning and/or dampened manner to the bearing housing. The size of the thrust bearing is not restricted and depends on the size of the pressurized shock absorber. The thrust bearing can have for example an axial length of approximately 10 mm up to approximately 60 mm, preferably approximately 15 mm up to approximately 40 mm. However, smaller or larger axial lengths are also conceivable. The diameter of the thrust bearing can be for example approximately 5 mm up to approximately 70 mm, preferably approximately 14 mm up to approximately 40 mm. However, smaller or larger diameters are also conceivable.

The inner sleeve can have a mainly cylindrical shape, wherein the inner diameter of the inner sleeve is dimensioned large enough that a section of the damping rod provided for this can be inserted through the inner sleeve. The inner sleeve has, in particular, the function of directing the radial forces from the damping rod evenly into the elastomer body. The inner sleeve preferably provides the necessary axial rigidity of the thrust bearing so that it can be mounted or respectively clamped between an inner sleeve of an axial bearing and a contact edge of the damping rod in order to transfer axial forces from the damping rod mainly uncushioned and/or undampened to the axial bearing. The inner sleeve is thus preferably made of metal, particularly preferably of high-strength steel. Furthermore, the inner sleeve preferably extends over the mainly entirely axial length of the thrust bearing, and the axial front surfaces of the inner sleeve are preferably free of other (in particular elastomeric) material. The inner sleeve can have a material thickness of approximately 0.5 to approximately 5 mm, preferably a material thickness of approximately 1 mm to approximately 3 mm, particularly preferably a material thickness of approximately 1.5 mm to approximately 2 mm.

Furthermore, the axial end of the inner sleeve facing the air spring space in the installed state of the thrust bearing can have a circumferential supporting edge, which can rest on a contact edge of the damping rod. The contact edge of the damping rod can be formed by a step between a vehicle-side section of the damping rod with a smaller diameter and an air-spring-space-side section of the damping rod with a larger diameter. For forming the supporting edge, the axial end of the inner sleeve facing the air spring space in the installed state of the thrust bearing can have a section protruding radially inward. However, the inner diameter of the inner sleeve can also be mainly constant over the entire axial length. Since the contact surface between the supporting edge of the inner sleeve and the contact edge of the damping rod can be small, high-strength material for secure power transmission is advantageous.

The inner surface of the inner sleeve can be designed in order to rest directly, or with elastomeric material of the elastomer body in between, on the outer surface of the damping rod. The inner surface of the inner sleeve can be partially or completely covered with elastomeric material of the elastomer body, wherein this elastomeric material can form a sealing geometry. However, the inner surface of the inner sleeve can also be free of elastomeric material of the elastomer body. The inner surface of the inner sleeve can have a receiving area for an O-ring, such as for example a circumferential receiving groove, in particular if a sealing geometry is not designed on the inner sleeve.

The outer sleeve can have at least partially a mainly cylindrical shape, wherein the outer sleeve is arranged mainly coaxially to the inner sleeve. The outer sleeve has in particular the function of transferring the radial forces from the inner sleeve over the elastomer body evenly to the bearing housing. Furthermore, the outer sleeve can contribute to the axial rigidity of the thrust bearing. The stability requirements for the outer sleeve are not as high as for the inner sleeve, so that aluminum or even a plastic can be used as the material in order to save money. The outer sleeve can have a material thickness of approximately 0.5 up to approximately 4 mm, preferably a material thickness of approximately 0.75 mm up to approximately 3 mm, particularly preferably a material thickness of approximately 1.5 mm to approximately 2 mm.

The outer surface of the outer sleeve can be designed in order to rest directly, or with elastomeric material of the elastomer body in between, on an inner wall of the bearing housing. The axial end of the outer sleeve facing the air spring space in the installed state of the thrust bearing can have a radially outward pointing flange, in order to support itself on the bearing housing in the axial direction. The outer surface of the outer sleeve can be partially or completely covered with elastomeric material of the elastomer body, wherein this elastomeric material can form a sealing geometry. However, the outer surface of the outer sleeve can also be free of elastomeric material of the elastomer body. The outer surface of the outer sleeve can have a receiving area for an O-ring, such as for example a circumferential receiving groove, in particular if a sealing geometry is not designed on the outer sleeve.

The elastomer body extends at least between the inner sleeve and the outer sleeve and interconnects them in particular in a cushioning and/or dampening manner. The elastomer body restricts further the pressurizable or respectively pressurized space of the shock absorber or respectively seals it in an airtight manner with respect to the environment (ambient pressure). The pressurized space of the shock absorber can be an air spring space of an air spring or respectively of an air spring strut. The thrust bearing can be produced through injection molding of the elastomer body around or respectively on the inner sleeve and/or the outer sleeve, in particular in a common tool.

The at least one sealing geometry is part of the elastomer body and is designed such that, in the installed state of the thrust bearing, an intermediate space or respectively gap between the inner sleeve and the damping rod and/or an intermediate space between the outer sleeve and the bearing housing (in particular of the inner wall of it) is closed or respectively sealed. The at least one sealing geometry can prevent compressed air from escaping from the pressurized space through the intermediate space or gap between the thrust bearing and damping rod and/or through the intermediate space or gap between the thrust bearing and bearing housing. One or more sealing geometries can be formed both on the inner sleeve as well as on the outer sleeve. The at least one sealing geometry can be shaped in the form of a circumferential bulge, a circumferential sealing lip, a circumferential partial section of a ring or another form suitable for sealing. If several sealing geometries are formed, their exact designs or respectively shapes can differ from each other.

According to the invention, the sealing function and the spring/damper function of the thrust bearing advantageously are realized by means of a single elastomer body or respectively elastomer component. This saves costs and simplifies the installation of the thrust bearing or respectively of the pressurized shock absorber.

The present invention further is advantageous in that the sealing geometry is connected permanently with the inner sleeve and/or the outer sleeve or respectively vulcanized onto it so that the sealing geometry adheres to the inner sleeve or respectively the outer sleeve and can be well supported on it. In particular, the sealing geometry can support itself in the axial direction on the inner sleeve or respectively outer sleeve, which enables an adjustment of the pressing force of the sealing geometry onto the damping rod or respectively onto the bearing housing. Thus, the pressing force of the sealing geometry can be adjusted towards the damping rod via the geometry of the sealing geometry in combination with the geometry of the inner sleeve of the thrust bearing and the geometry of the inner sleeve of the axial bearing. In a similar manner, the pressing force of the sealing geometry can be adjusted towards the bearing housing via the geometry of the sealing geometry in combination with the geometry of the outer sleeve of the thrust bearing and the geometry of the bearing housing.

Furthermore, a twisting of the seal, as can happen with O-rings during installation (during insertion of the damping rod) or during thermal expansion of the damping rod (abrasion through the "eraser effect" during twisting of the seal caused by the relative movement between damping rod and thrust bearing), is prevented by the permanent connection of the sealing geometry to the inner sleeve or respectively the outer sleeve. Thus, according to the invention, a correct sealing can be ensured during installation and a rubbing off of the seal during use can be prevented.

The at least one sealing geometry on the outer sleeve, in particular on an axial end of it, may protrudes radially outward.

The sealing geometry can be arranged in particular on an axial end of the outer sleeve facing away from the pressurizable space in the installed state. This is particularly advantageous since the thrust bearing is pressed against the bearing housing in the installed state due to the pressure of the pressurizable space facing away the axial end, whereby the sealing function can be strengthened.

The at least one sealing geometry on the inner sleeve, in particular on an axial end of it, may protrude radially inward.

The sealing geometry can be arranged in particular on an axial end of the inner sleeve facing away from the pressurizable space in the installed state. This is particularly advantageous since the thrust bearing is pressed against the inner sleeve of the axial bearing in the installed state by the pressure of the pressurizable space facing away the axial end, whereby the sealing function can be strengthened. The thrust bearing can have both a sealing geometry on an axial end of the inner sleeve as well as a sealing geometry on an axial end of the outer sleeve.

The at least one sealing geometry may protrude from an axial end of the outer sleeve and/or from an axial end of the inner sleeve in the axial direction.

The sealing geometry can protrude in the axial direction in particular on an axial end of the inner sleeve and/or of the outer sleeve facing away from the pressurizable space in the installed state. In the case of a sealing geometry on the inner sleeve, the part of the sealing geometry protruding in the axial direction can be displaced or respectively pressed radially inward during installation through the inner sleeve of the axial bearing so that during installation the pressing force of the sealing geometry can be strengthened. In the case of a sealing geometry on the outer sleeve, the part of the sealing geometry protruding in the axial direction can be displaced or respectively pressed radially outward during installation through the bearing housing, which can also strengthen the pressing force of the sealing geometry.

The at least one sealing geometry may be designed as a circumferential bulge.

The bulge can protrude on the inner sleeve radially inward and/or on the outer sleeve radially outward.

By bulge, we mean that the sealing geometry in cross-section has a mainly edge-less progression without undercuts. The height (the radial extension) of the bulge is preferably less than the width of its base. It can advantageously be prevented through such a design that the sealing geometry is unfavorably deformed during installation by the friction or that high friction occurs through a relative movement of the damping rod during thermal expansion.

The elastomer body may have a functional geometry may connect in a cushioning manner the inner sleeve and the outer sleeve and receives mainly radial forces.

The functional geometry is designed between the inner sleeve and the outer sleeve. Through the exact shape of the functional geometry, the spring properties and/or dampening properties of the thrust bearing can be adjusted. In particular, circumferential, annular recesses can be provided on one or both axial ends of the elastomer body in order to adjust the radial rigidity of the thrust bearing.

At least one sealing geometry can be made of a different material than the remaining elastomer body.

Through the use of different materials for the sealing geometry and the remaining elastomer body, the materials can be optimally adjusted based on need. Thus, for the sealing geometry, a material with a good settlement can be used, which is important for ensuring the sealing function. In contrast, for the remaining elastomer body, in particular the functional geometry, a material with a high durability can be used, since the functional geometry must constantly adjust itself to the movement of the damping rod. For example, elastomers from different families or even elastomers from the same family but with different hardnesses can be used for this. The use of TPE (thermoplastic elastomers) is also conceivable here.

The elastomer body may be a vulcanization component.

Even in the case of the use of different materials for the sealing geometry and the remaining elastomer body (the functional geometry), the two materials can be inserted into the component in a two-component process so that the elastomer body can continue to represent a vulcanization component. In particular, the thrust bearing can be produced in a common tool in a vulcanization process. The two different materials can mix during the production of the thrust bearing at a suitable location in the component.

The inner sleeve and/or the outer sleeve preferably have at least one passage recess.

The passage recess has the function of letting the elastomer materials flow through during the production process, in particular during the injection molding of the inner sleeve and/or the outer sleeve with the elastomeric material of the elastomer body so that elastomeric material can be arranged for example on the inner surface of the inner sleeve and/or on the outer surface of the outer sleeve. A passage recess is advantageous in particular for the arrangement of elastomeric material on the inner surface of the inner sleeve since then the inner sleeve can be clamped in the tool with the two axial front surfaces, and the axial front surfaces of the inner sleeve can thus be kept free of elastomeric material.

The passage recesses can be for example bore holes and/or slits. A plurality of passage recesses can be designed distributed over the circumference of the inner sleeve and/or outer sleeve.

The outer sleeve preferably has, on an axial end, a circumferential, radially inward pointing shoulder area, wherein the at least one sealing geometry is designed on the shoulder area of the outer sleeve.

The radially inward pointing shoulder area enables, through the enlarged contact surface, an improved support of the sealing geometry on the outer sleeve, which leads to an even more improved adjustability of the sealing function of the thrust bearing. In a similar manner, the inner sleeve can have alternatively or additionally, on an axial end, a circumferential, radially outward pointing shoulder area, wherein a sealing geometry is designed on the shoulder area of the inner sleeve. However, instead of a shoulder area, the inner sleeve can also have a slant or phase designed between the inner surface and the axial front surface, with a similar technical effect. The design as a slant or phase is simpler to produce and the axial front surface of the inner sleeve can advantageously continue to serve as a contact surface for the inner sleeve of the axial bearing.

The at least one sealing geometry may be designed so that, during installation of the thrust bearing in the pressurized shock absorber or respectively the air spring strut, the at least one sealing geometry on the inner sleeve is pressed against a damping rod and/or on the outer sleeve is pressed against an inner wall of a bearing housing or respectively housing cover.

The sealing function of the thrust bearing is advantageously improved by such a design of the sealing geometry during installation of the thrust bearing. In particular, the force for twisting the thrust bearing can be partially transferred to the sealing geometry in order to strengthen the pressing force of the sealing geometry.

Exemplary embodiments of the present invention are described in greater detail below based on the attached drawings.

DETAILED DESCRIPTION

Figure 1:
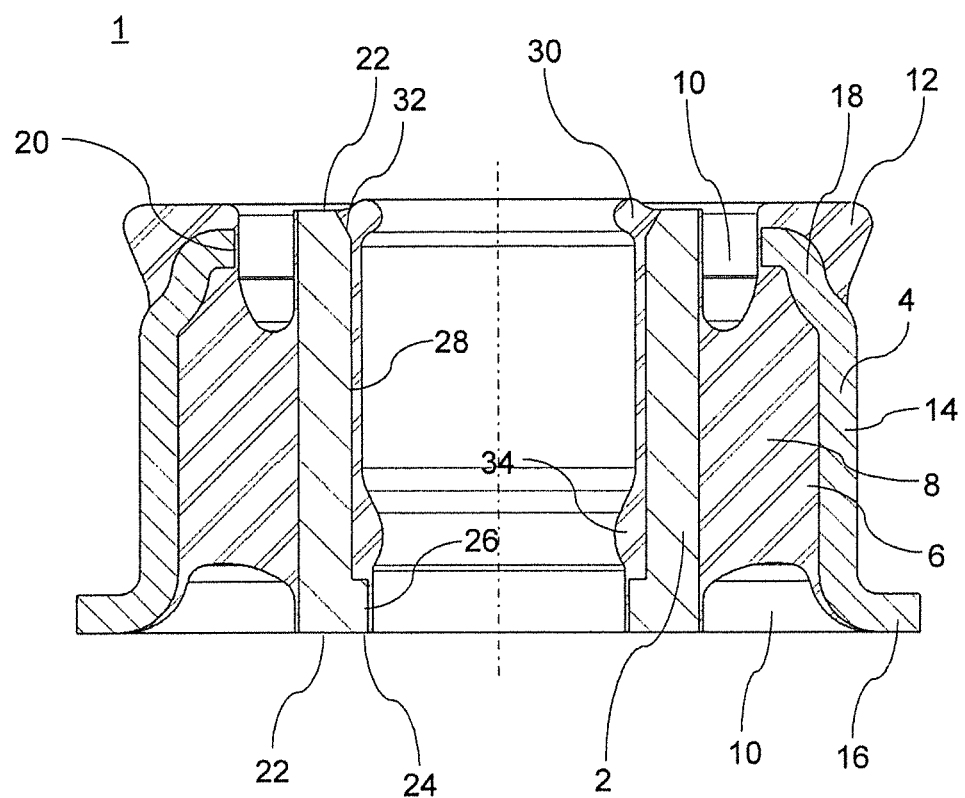
FIG. 1 a sectional view of the thrust bearing according to a first embodiment.

FIG. 1 shows a sectional view of a thrust bearing 1 according to a first embodiment. The thrust bearing 1 is designed mainly annularly and axially symmetrically, and the figures each show a cut through the symmetrical axis of the thrust bearing 1. The thrust bearing 1 has a mainly cylindrical inner sleeve 2 as well as a concentrically arranged, mainly cylindrical outer sleeve 4. The inner sleeve 2 is connected with the outer sleeve 4 via an elastomer body 6.

The section of the elastomer body 6 between the inner sleeve 2 and the outer sleeve 4 serves as functional geometry 8, which is designed to receive in a cushioning and dampening manner forces between the damping rod and the bearing housing via the inner sleeve 2 and the outer sleeve 4. Circumferential, annular recesses 10 can be formed on one or on both axial ends of the elastomer body 6 between the inner sleeve 2 and the outer sleeve 4.

The elastomer body 6 has an outer sealing geometry 12 on the axial end facing away from the pressurizable space. The outer sealing geometry 12 is designed on the corresponding axial end of the outer sleeve 4. The outer sleeve 4 has a mainly cylindrical section 14 for the radial arrangement on an inner wall of the bearing housing, a mounting flange 16 bent radially outward for the axial arrangement on the bearing housing, as well as a radially inward bent, circumferential shoulder area 18 for better power intake by the outer sealing geometry 12. The outer sealing geometry 12 is designed in particular on the shoulder area 18 so that the adhesive surface of the outer sealing geometry 12 is enlarged on the outer sleeve 4. The outer sealing geometry 12 protrudes circumferentially and radially outward relative to the cylindrical section 14. In particular, the outer sealing geometry 12 bulges circumferentially and radially outward relative to the cylindrical section 14. The outer sealing geometry 12 can be connected with the functional geometry 8 via a web section 20, wherein the web section 20 can be formed on an end of the shoulder area 18 of the outer sleeve 4. If different materials are used for the outer sealing geometry 12 and for the functional geometry 8, the mixing area of the two materials can be arranged in the area of the web section 20, or the web section can be forgone so that both areas (functional geometry and sealing geometry) are completely separated from each other.

The inner sleeve 2 is formed mainly over the entire axial length of the thrust bearing 1 and has exposed front surfaces 22 on both axial ends. The front surface 22 facing the pressurizable space has a supporting edge 24 for axial supporting the inner sleeve 2 on a contact edge of the damping rod. The corresponding axial end of the inner sleeve 2 has a section 26 protruding radially inward for forming the supporting edge 24.

The inner surface 28 of the inner sleeve 2 is completely covered with elastomeric material of the elastomer body 6. The thrust bearing 1 or respectively the elastomer body 6 has a first inner sealing geometry 30 on the axial end facing away from the pressurizable space. The first inner sealing geometry 30 is designed on the corresponding axial end of the inner sleeve 2. The first inner sealing geometry 30 protrudes circumferentially and radially inward relative to the mainly cylindrical inner surface of the thrust bearing 1 or respectively of the elastomer body 6. Furthermore, the first inner sealing geometry 30 protrudes circumferentially in the axial direction relative to the axial front surface 22 of the corresponding axial end of the inner sleeve 2. The corresponding axial end of the inner sleeve 2 has a circumferential phase or respectively a slant 32 on the inside. The first inner sealing geometry 30 is designed in particular on the slant 32, so that the adhesive surface of the first inner sealing geometry 30 is enlarged on the inner sleeve 2.

The thrust bearing 1 or respectively the elastomer body 6 has a second inner sealing geometry 34 in the intermediate area between the two axial ends on the inner surface of the inner sleeve 2. The second inner sealing geometry 34 protrudes circumferentially and radially inward relative to the mainly cylindrical inner surface of the thrust bearing 1 or respectively of the elastomer body 6. In particular, the second inner sealing geometry 34 bulges circumferentially and radially inward relative to the mainly cylindrical inner surface of the thrust bearing 1 or respectively of the elastomer body. The duplicate sealing by means of the first and second inner sealing geometry 30, 34 improves the sealing properties of the thrust bearing 1.

Figure 2:
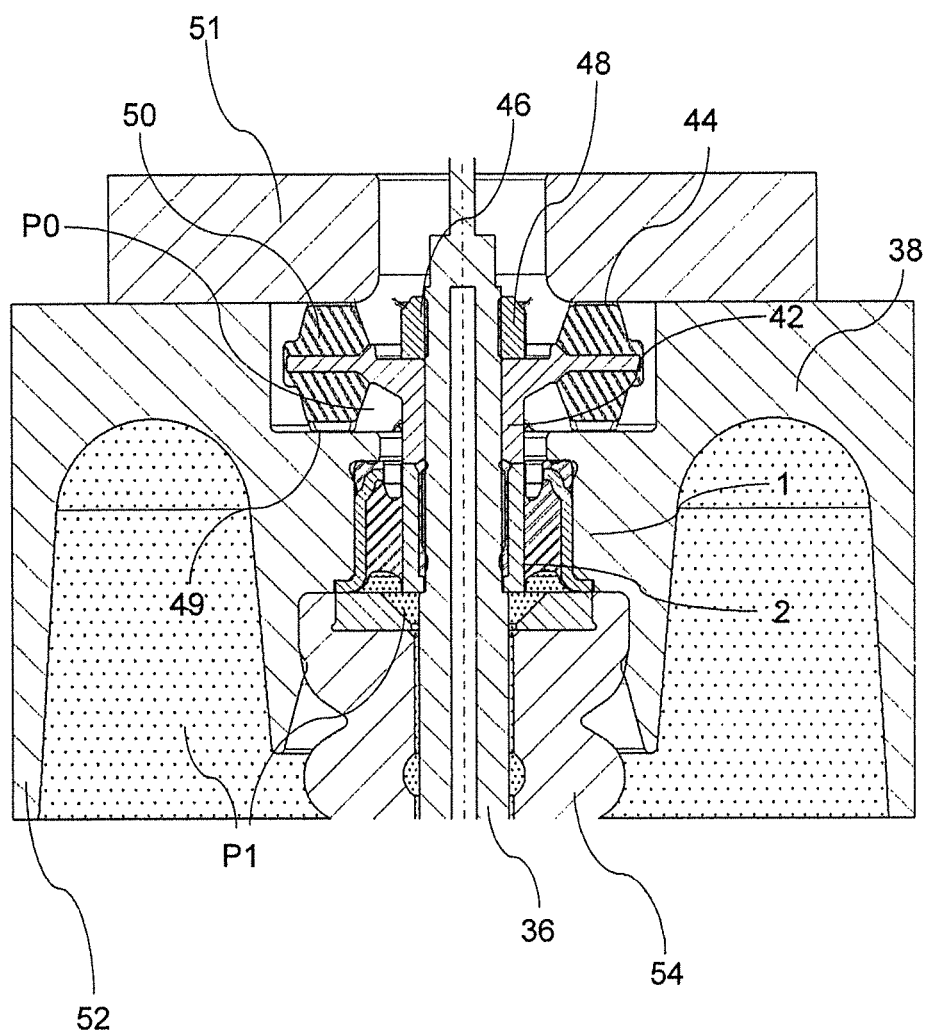
FIG. 2 a sectional view of the thrust bearing according to the first embodiment in the installed state on a damping rod and in a bearing housing.
Figure 3:
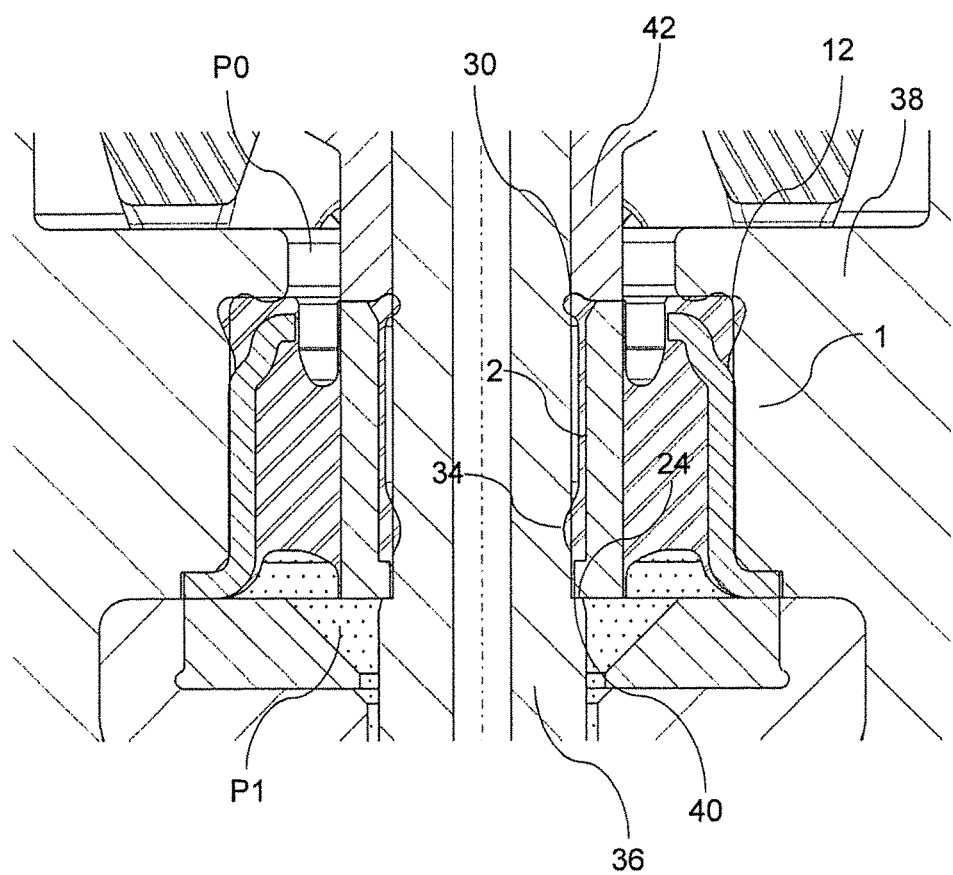
FIG. 3 an enlarged representation of the area of the thrust bearing of FIG. 2.

FIGS. 2 and 3 show the thrust bearing 1 according to the first embodiment in the installed state on a damping rod 36 and in a bearing cover or respectively bearing housing 38. In the installed state, the damping rod 36 is fed through the inner, mainly cylindrical recess of the thrust bearing 1, and the supporting edge 24 of the inner sleeve 2 rests on the contact edge 40 of the damping rod 36. Furthermore, the thrust bearing 1 is inserted in the installed state into a mainly cylindrical recess of the bearing housing 38. The inner sleeve 2 is clamped or respectively mounted between the contact edge 40 of the damping rod 36 and an inner sleeve 42 of an axial bearing 44. For this, the damping rod 36 extends through the inner, mainly cylindrical recess of the inner sleeve 42 of the axial bearing 44. A thread section 46 is designed on one end section of the damping rod 36 so that the inner sleeve 42 of the axial bearing 44 and the inner sleeve 2 of the thrust bearing 1 can be clamped or respectively mounted between a nut 48 and the contact edge 40.

An axial elastomer body 50, which connects the inner sleeve 42 of the axial bearing 44 with the bearing housing 38, is arranged on the inner sleeve 42 of the axial bearing 44. The axial elastomer body 50 has the function of receiving in a cushioning and/or dampening manner axial forces from the damping rod 36 via the inner sleeve 42 and to transferring them to the bearing housing 38. The axial elastomer body 50 is arranged between an axial contact surface 49 of the bearing housing 38 and a cover element 51 of the bearing housing 38. The damper head mounting is thus fastened on the damping rod 36 through the clamping of the two inner sleeves 2, 42 by means of the nut 48.

The first inner sealing geometry 30 is hereby designed such that, during the clamping of the inner sleeve 2 between the contact edge 40 of the damping rod 36 and an inner sleeve 42 of an axial bearing 44, the first inner sealing geometry 30 is displaced by the axial front surface of the inner sleeve 42 of the axial bearing 44 and pressed against the outer surface of the damping rod 36. The sealing effect of the first inner sealing geometry 30 is hereby strengthened. The bearing housing 38 is similarly pressed in the axial direction against the outer sealing geometry 12 during clamping by means of the nut 48. In FIGS. 2 and 3, the sealing geometries 12, 30, 34 are shown in the non-deformed state.

The bearing housing 38 has an installation section 52 for installing an air spring strut (not shown) outside on the axial end facing the pressurizable space P1. The sealing geometries 12, 30, 34 seal the pressurizable space P1 inside the bearing housing 38 and of the air spring strut with respect to the environment (the ambient pressure) P0. A stop body 54, which is clipped onto the bearing housing 38 in an area of the bearing housing 38 on the axial end of the thrust bearing 1 facing the pressurizable space P1, can be arranged in the pressurizable space P1. The pressurizable space P1 is shown dotted in the figures.

Figure 4:
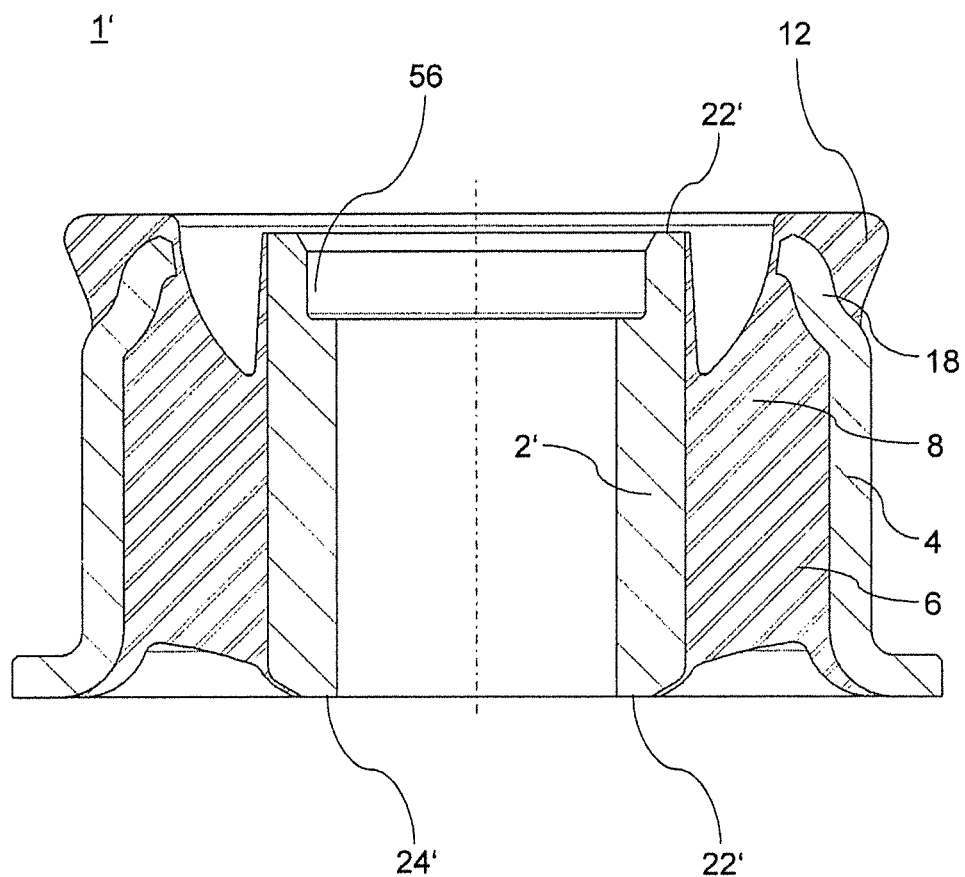
FIG. 4 a sectional view of a thrust bearing of a second embodiment.

FIG. 4 shows a sectional view of a thrust bearing 1' according to a second embodiment. The thrust bearing 1' according to the second embodiment differs from that of the first embodiment in that the thrust bearing 1' only has the outer sealing geometry 12 designed on the outer sleeve 4. In contrast, there is no sealing geometry formed on the inner sleeve 2', which simplifies the production of the thrust bearing 1'. Instead, the inner sleeve 2' of the thrust bearing 1' has a circumferential sealing-ring recess 56 on the inside of the axial end facing away from the pressurizable space, which is formed by a section with an enlarged inner diameter. The sealing-ring recess 56 is designed such that an O-ring (not shown) can be arranged in it, which then protrudes radially inward at least relative to the mainly cylindrical inner surface of the inner sleeve 2'. However, the O-ring arranged in the sealing-ring recess 56 can also protrude in the axial direction relative to the axial front surface 22' of the corresponding end of the inner sleeve 2' so that the O-ring is pressed against the outer surface of the damping rod 36 by the inner sleeve 42 of the axial bearing 44 during installation. Another difference compared to the first embodiment is that the inner sleeve 2' has no radially inward protruding section for forming the supporting edge 24'. Rather, the supporting edge 24' is provided by the corresponding axial front surface 22' of the inner sleeve 2', which also lowers the production costs. For the rest, we refer to the explanations regarding the first embodiment.

Figure 5:
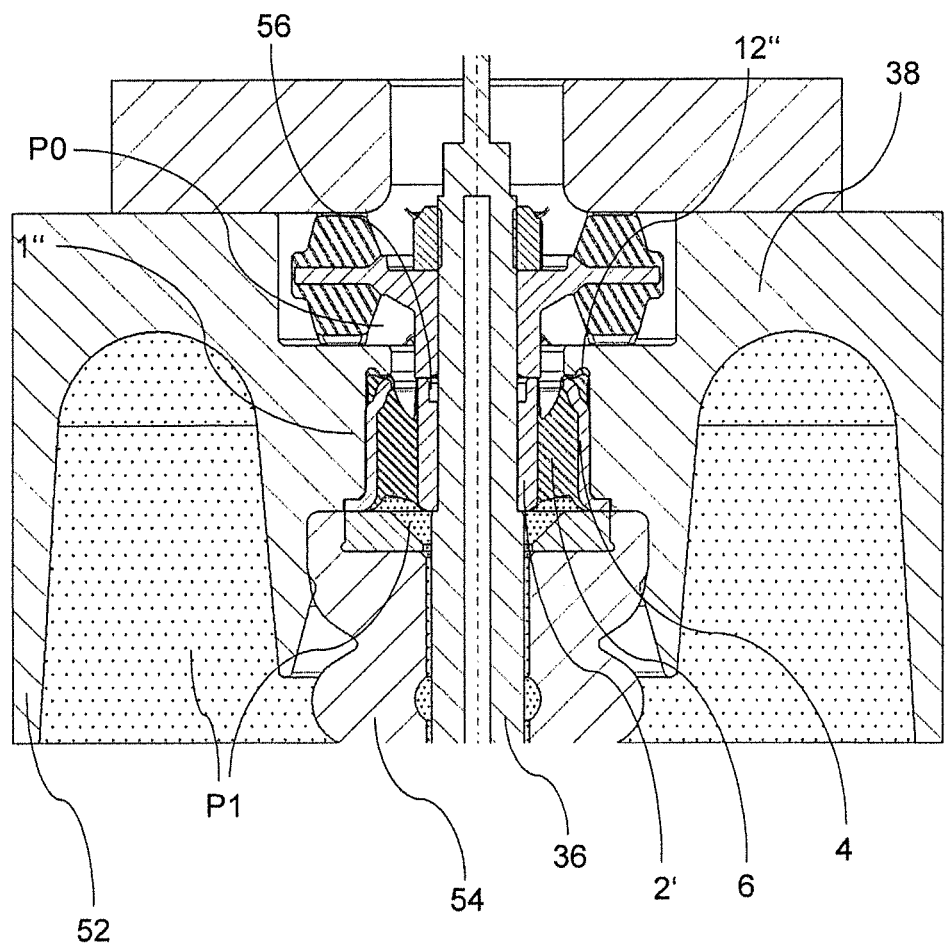
FIG. 5 a sectional view of a thrust bearing according to a third embodiment in the installed state on a damping rod and in a bearing housing.
Figure 6:
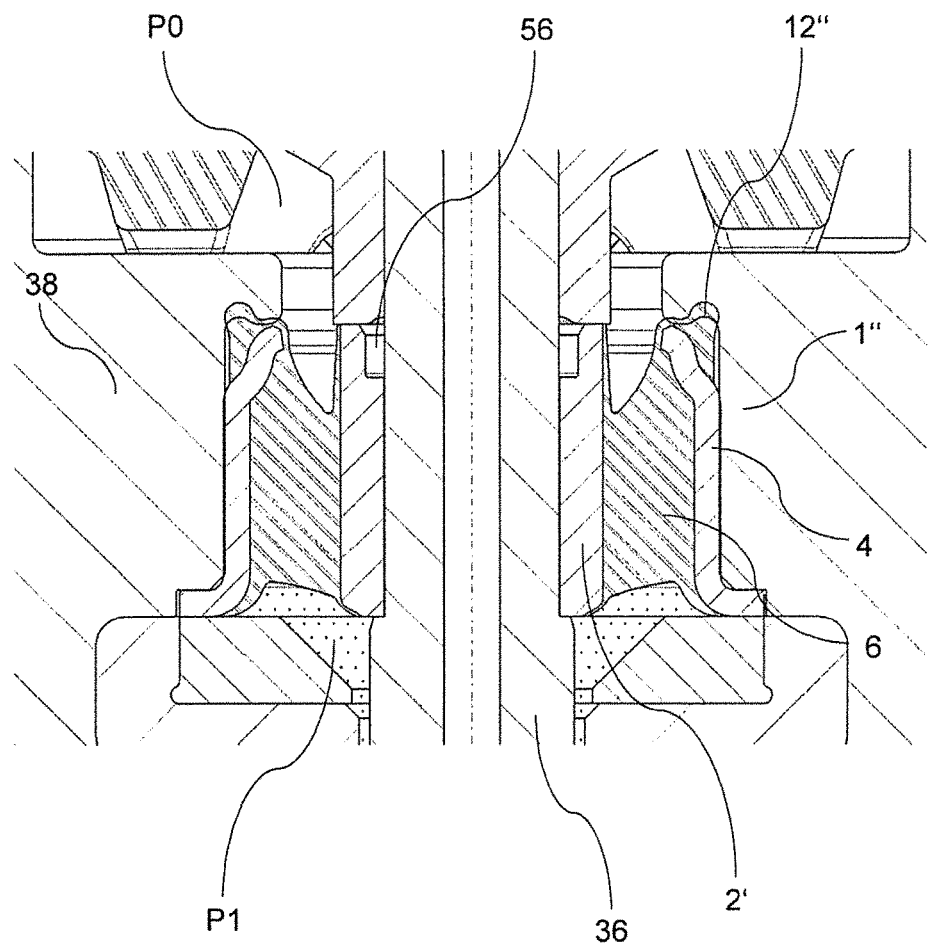
FIG. 6 an enlarged representation of the area of the thrust bearing of FIG. 5.

FIGS. 5 and 6 show a thrust bearing 1" according to the third embodiment in the installed state. The thrust bearing 1" according to the third embodiment differs from the thrust bearing 1' according to the second embodiment in that the outer sealing geometry 12" on the outer sleeve 4 protrudes or respectively projects mainly in the axial direction. During installation, the sealing geometry 12" is pressed in the axial direction against the bearing housing 38, in particular of an axial stop wall of a receiving area for the thrust bearing of it. However, the figures show the non-deformed state of the sealing geometry 12". The pressing force of the sealing geometry 12" is strengthened by the pressure of the pressurizable space P1, which acts on the elastomer body 6 or respectively on the thrust bearing 1".

The inner sleeve 2' rests in the installed state mainly on the damping rod 36, and an O-ring (not shown) arranged in the sealing-ring recess 56 seals the gap between the damping rod 36 and the inner sleeve 2'. The configuration of the damping rod 36 shown in FIGS. 5 and 6 and of the bearing housing 38 corresponds with the configuration of the damping rod 36 shown in FIGS. 2 and 3 and of the bearing housing 38.

LIST OF REFERENCE NUMBERS

1, 1', 1" Thrust bearing
2, 2' Inner sleeve
4 Outer sleeve
6 Elastomer body
8 Functional geometry
10 Annular recess
12, 12" Outer sealing geometry
14 Cylindrical section, outer sleeve
16 Mounting flange
18 Shoulder area
20 Web section
22, 22' Axial front surface
24, 24' Supporting edge
26 Protruding section, inner sleeve
28 Inner surface, inner sleeve
30 First inner sealing geometry
32 Slant, inner sleeve
34 Second inner sealing geometry
36 Damping rod
38 Bearing housing
40 Contact edge
42 Inner sleeve, axial bearing
44 Axial bearing
46 Thread section
48 Nut
49 Axial contact surface
50 Axial elastomer body
51 Cover element
52 Installation section
54 Stop body
56 Sealing-ring recess
P0 Environment
P1 Pressurizable space

What is claimed is:

1. A thrust bearing (1, 1', 1") for a pressurized shock absorber, comprising:
an inner sleeve (2, 2') having an inner surface (28);
an outer sleeve (4); and
an elastomer body (6) that connects the inner sleeve (2, 2') and the outer sleeve (4) and is configured to delimit a pressurizable space (P1) of the shock absorber, the elastomer body (6) having at least one sealing geometry (12, 12", 30, 34), the at least one sealing geometry (12, 12", 30, 34) including at least one sealing geometry (30, 34) formed on the inner sleeve (2) and protruding radially inward from the inner sleeve (2) farther than any part of the inner surface (28) of the inner sleeve (2), the at least one sealing geometry (30) being configured so that, during installation of the thrust bearing (1, 1', 1") in the pressurized shock absorber, the at least one sealing geometry (30) on the inner sleeve (2) is pressed directly against a damping rod (36).

2. The thrust bearing (1, 1') of claim 1, wherein the at least one sealing geometry (12, 12", 30, 34) further includes at least one sealing geometry (12) on the outer sleeve (4) that protrudes radially outward from the outer sleeve (4).

3. The thrust bearing (1, 1', 1") of claim 2, wherein an axial end of the outer sleeve (4) has a circumferential, radially inward pointing shoulder area (18) and wherein the at least one sealing geometry (12) is on the shoulder area (18) of the outer sleeve (4).

4. The thrust bearing (1, 1', 1") of claim 2, wherein the at least one sealing geometry (12, 12", 30) is configured so that, during installation of the thrust bearing (1, 1', 1") in the pressurized shock absorber, the at least one sealing geometry (12, 12", 30) on the outer sleeve (4) is pressed against an inner wall of a bearing housing (38).

5. The thrust bearing (1, 1', 1") of claim 2, wherein the at least one sealing geometry (12, 12", 30) protrudes in an axial direction from an axial end of the outer sleeve (4).

6. The thrust bearing (1, 1', 1") of claim 1, wherein the at least one sealing geometry (12, 12", 30) protrudes in an axial direction from an axial end of the inner sleeve (2).

7. The thrust bearing (1, 1', 1") of claim 1, wherein the at least one sealing geometry (12, 34) is a circumferential bulge.

8. The thrust bearing (1, 1', 1") of claim 1, wherein the elastomer body (6) has a functional geometry (8) that connects the inner sleeve (2, 2') and the outer sleeve (4) in a cushioning manner and receives mainly radial forces.

9. The thrust bearing (1, 1', 1") of claim 1, wherein the at least one sealing geometry (12, 12", 30, 34) is made of a different material than a remainder of the elastomer body (6).

10. The thrust bearing (1, 1', 1") of claim 1, wherein the elastomer body (6) is a vulcanization component.

11. The thrust bearing (1, 1', 1") of claim 1, wherein the inner sleeve (2, 2') and/or the outer sleeve (4) have at least one passage recess.

12. The thrust bearing (1, 1', 1") of claim 1, wherein the inner sleeve (2, 2') has opposite first and second axial ends, the inner surface (28) extending between the opposite first and second axial ends of the inner sleeve (2), the inner surface (28) of the inner sleeve (2) being completely covered by the elastomer body (6).

13. A thrust bearing (1, 1', 1") for a pressurized shock absorber, comprising:
   an inner sleeve (2, 2');
   an outer sleeve (4) having a cylindrical section (14) with opposite first and second longitudinal ends, a mounting flange (16) projecting out at the first longitudinal end of the cylindrical section (14) of the outer sleeve (4); and
   an elastomer body (6) that connects the inner sleeve (2, 2') and the outer sleeve (4) and is configured to delimit a pressurizable space (P1) of the shock absorber, the elastomer body (6) having at least one sealing geometry (12, 12") formed on the outer sleeve (4) at positions spaced from the mounting flange (16) and protruding radially outward farther than outer circumferential surface areas of the cylindrical section (14) of the outer sleeve (4), the at least one sealing geometry (12, 12") on the outer sleeve (4) being configured so that, during installation of the thrust bearing (1, 1', 1") in the pressurized shock absorber, the at least one sealing geometry (12, 12") on the outer sleeve (4) is pressed directly against an inner wall of a bearing housing (38) that surrounds the cylindrical section (14) of the outer sleeve (4).

14. The thrust bearing (1, 1', 1") of claim 13, wherein the at least one sealing geometry (12) on the outer sleeve (4) is a circumferential bulge.

15. The thrust bearing (1, 1', 1") of claim 14, wherein the at least one sealing geometry (12, 12", 30) on the outer sleeve (4) protrudes in an axial direction from an axial end of the outer sleeve (4).

16. The thrust bearing (1, 1', 1") of claim 13, wherein the outer sleeve (4) further has a circumferential shoulder area (18) bent radially inward at the second longitudinal end of the cylindrical section (14), the at least one sealing geometry (12, 12') formed on the outer sleeve (4) at a position substantially aligned with the shoulder area (18) and protruding radially outward farther than the shoulder area (18) of the outer sleeve (4).

17. The thrust bearing (1, 1', 1") of claim 13, wherein the elastomer body (6) has a functional geometry (8) that connects the inner sleeve (2, 2') and the outer sleeve (4) in a cushioning manner and receives mainly radial forces.

18. The thrust bearing (1, 1', 1") of claim 13, wherein the at least one sealing geometry (12, 12", 30, 34) is made of a different material than a remainder of the elastomer body (6).

19. The thrust bearing (1, 1', 1") of claim 13, wherein the elastomer body (6) is a vulcanization component.

20. The thrust bearing (1, 1', 1") of claim 13, wherein the inner sleeve (2, 2') and/or the outer sleeve (4) have at least one passage recess.

* * * * *